P. A. CUSTER.
SEED PLANTER.
APPLICATION FILED JAN. 16, 1911.
1,039,105.
Patented Sept. 24, 1912.
3 SHEETS—SHEET 1.
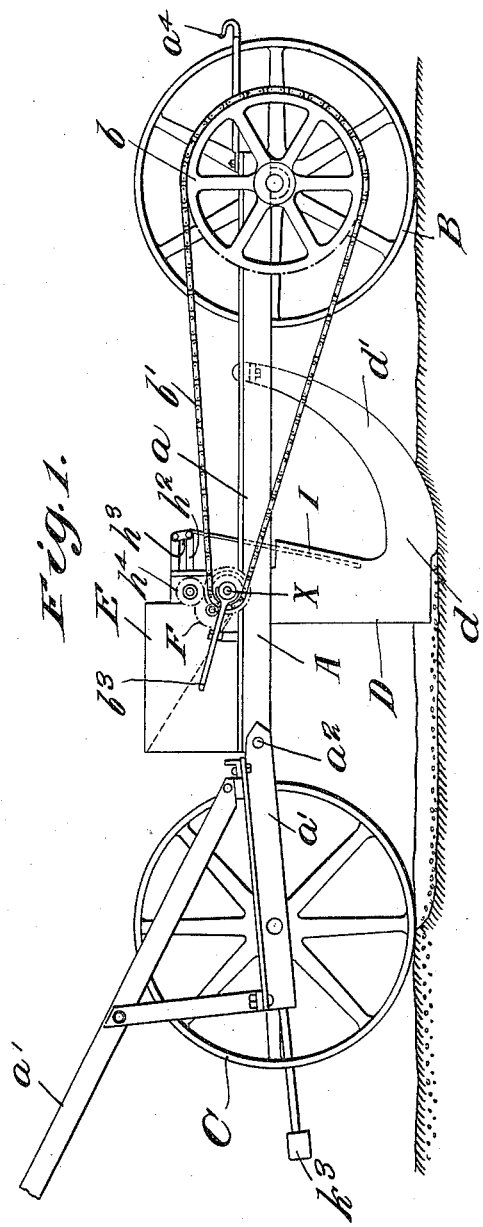
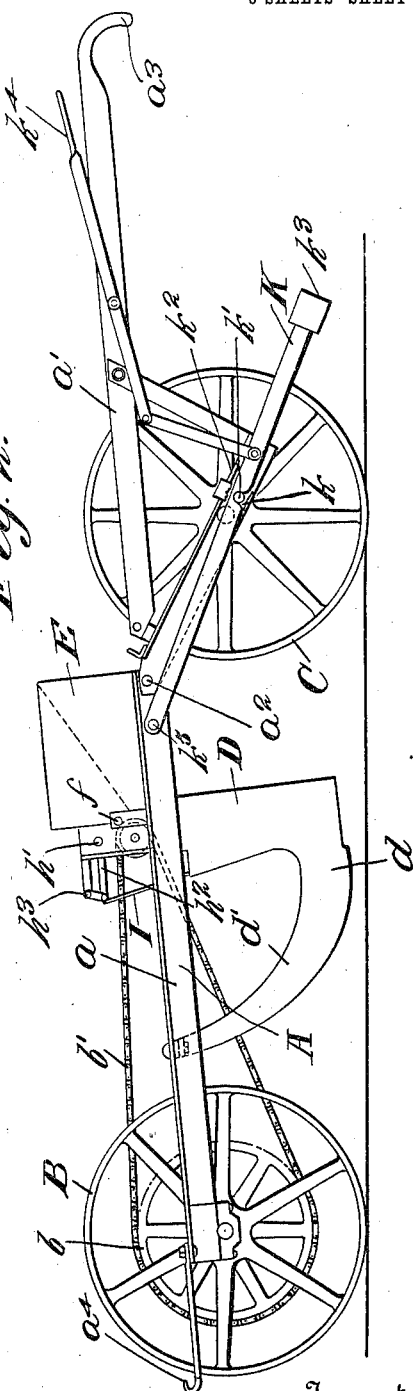
Witnesses:
Harry L. Hebig
Ired White
Inventor
Peter A. Custer,
By his Attorneys
Fraser Trick & Myers P. A. CUSTER.
SEED PLANTER.
APPLICATION FILED JAN. 16, 1911.
1,039,105.
Patented Sept. 24, 1912.
3 SHEETS—SHEET 2.
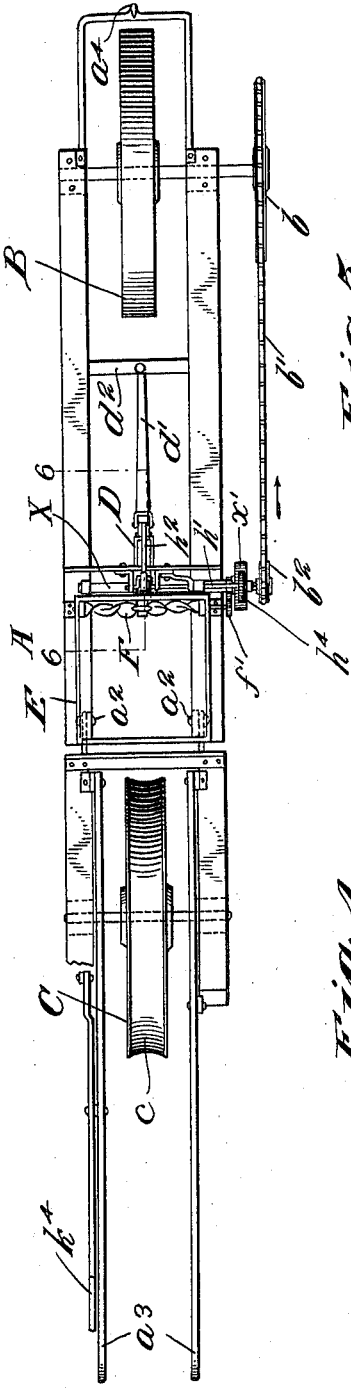
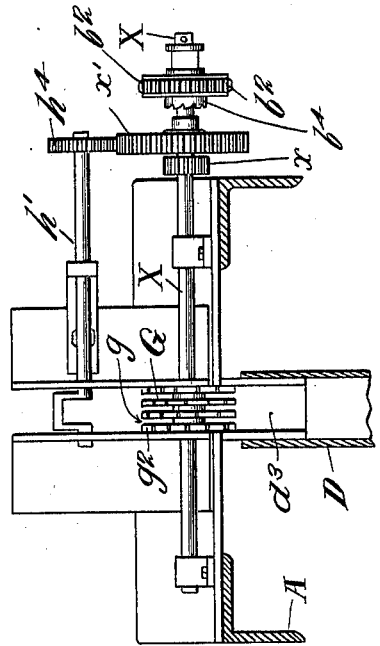
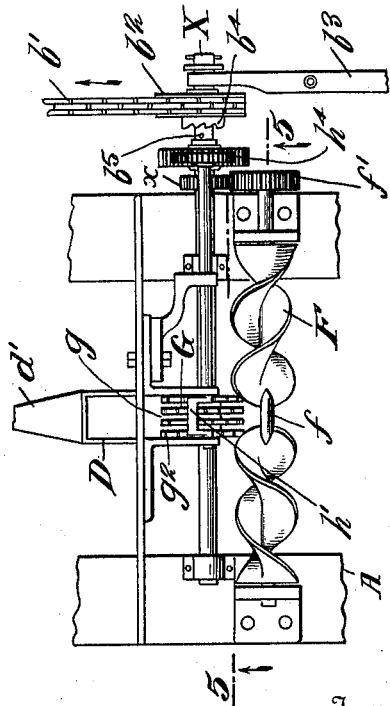

P. A. CUSTER.
SEED PLANTER.
APPLICATION FILED JAN. 16, 1911.
1,039,105.
Patented Sept. 24, 1912.
3 SHEETS—SHEET 3.
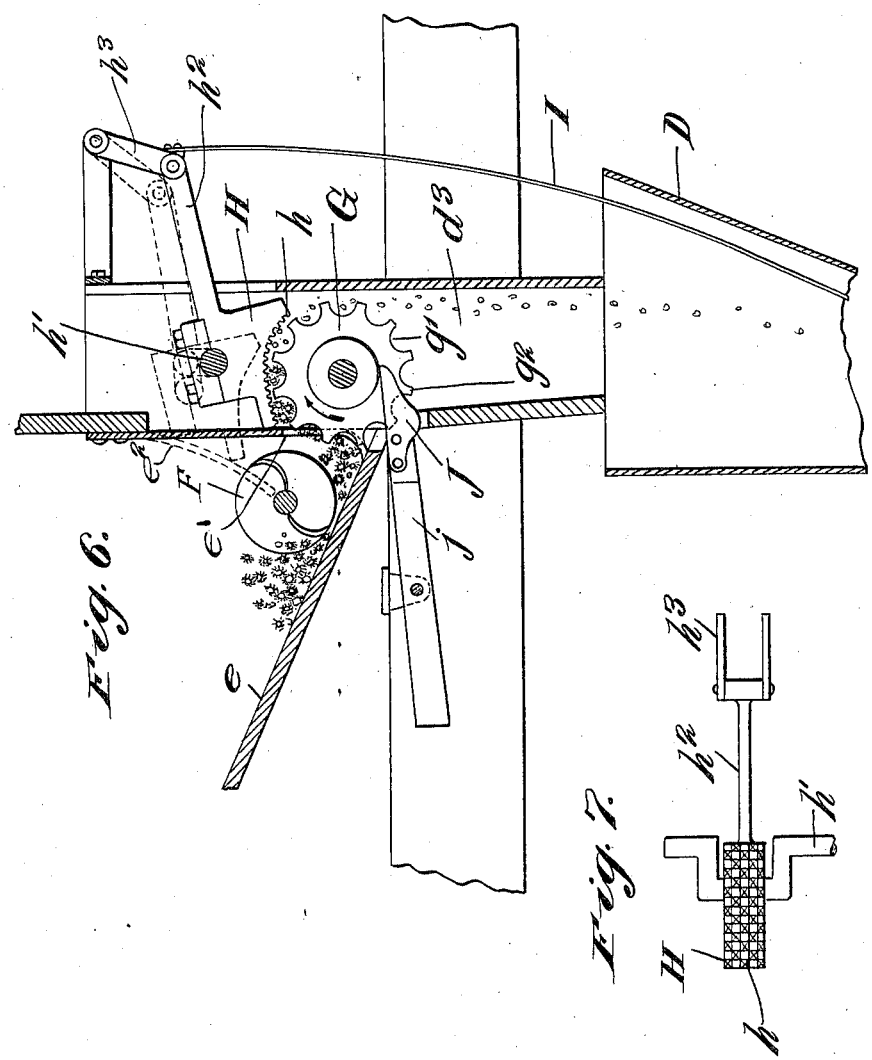

UNITED STATES PATENT OFFICE.

PETER A. CUSTER, OF WOODRIVER, ILLINOIS, ASSIGNOR OF ONE-TENTH TO EDWARD G. MERIWETHER, OF ALTON, ILLINOIS, AND FOUR-TENTHS TO MARTIN HELLER, OF GRANITE CITY, ILLINOIS.

SEED-PLANTER.

1,039,105.   Specification of Letters Patent.   Patented Sept. 24, 1912.

Application filed January 16, 1911. Serial No. 602,806.

*To all whom it may concern:*

Be it known that I, PETER A. CUSTER, a citizen of the United States, residing at Woodriver, in the county of Madison and State of Illinois, have invented certain new and useful Improvements in Seed-Planters, of which the following is a specification.

My invention relates to machines for planting seed, and is particularly adapted for use with cotton seed. This seed, owing to the fragments of cotton lint which adhere to the seed, and to the gummy or sticky nature of this seed, is particularly difficult to plant by an automatically operating machine. It is found that usually such machines will deposit the seed in lumps or bunches of fifteen to fifty seeds in a place, and frequently leaving spaces of from 1 or 2 to 10 or 12 feet in which no seeds are planted, while large bunches of seeds are accumulating in the machine.

My invention has for its object to provide in such a machine feeding devices whereby the cotton seeds will be automatically separated from each other and delivered singly or approximately so ready for planting by the machine. This object I accomplish by the aid of the particular embodiment of my invention illustrated in the accompanying drawings, where it is shown in connection with an organized machine.

In the said drawings,—Figure 1 is a side elevation of the right hand side of the said machine; Fig. 2 is a similar elevation of the left hand side; Fig. 3 is a plan view of the machine; Fig. 4 is a detail plan view from which parts are omitted for clearness; Fig. 5 is a transverse section on the line 5, 5 of Fig. 4. Fig. 6 is a detail longitudinal section on the line 6—6, Fig. 3, and Fig. 7 is a detail face view of a separator.

The feeding devices which comprise my present invention in the form illustrated comprise a hopper for the feed supply, within which is situated a conveyer for conveying the seed to the feeding point, and adjacent to the said feeding point is located a carrier for transporting the seed to the dropping point. In connection with this carrier I have illustrated what I term a separator, the function of which is to break up the clusters of seeds and to separate the seeds from each other and cause them to drop singly or approximately so. This separator is situated adjacent the feeding point so that when the seed have been separated thereby they will have no further chance to unite in clusters.

As illustrated, the seed is dropped through a hollow leg, the lower point of which, acting as a plow or furrow opener, forms the trench for receiving the seed. A suitable agitator, in the form of a movable shelf I, may well be placed within the said leg for the purpose of agitating the seed and preventing its accumulation.

A more particular description of the form in which I have illustrated my invention is as follows:—The hopper E within which is placed the seed to be planted, is preferably formed, as clearly illustrated in Fig. 6, with a sloping bottom $e$ which inclines toward the front of the machine and within which is situated a conveyer F for conveying the said seed to the discharge opening $e^1$. This conveyer, as illustrated in Fig. 4, is preferably in the form of a double-screw conveyer F rotating to feed the seed toward the center, at which point the wings of the conveyer are omitted and a shaft $f$ of reduced size is provided. The said conveyer is rotated in the direction of the arrow in Fig. 6 by a sprocket wheel $b$ on the axle of the wheel B which may be removed for the purpose of substituting another wheel of different size and varying the amount of seed fed. A sprocket chain $b^1$ connects the said wheel to a smaller sprocket wheel $b^2$ on the shaft X, and this slides upon its shaft X to be controlled by a hand lever $b^3$. A clutch $b^4$ clutches against a pin $b^5$ on the shaft X. Upon the end of the screw conveyer shaft a gear $f^1$ is mounted which meshes in a smaller gear $x$ on the shaft X, whereby the screw conveyer is rotated from the front wheel. Upon the shaft X is mounted the carrier G, and I have illustrated the said carrier as being composed of a number (in this instance four) of rotary disks which may be formed separately or as an integral structure, as desired. These disks are separated by radial spaces or channels $g$ and the periphery of each disk is preferably formed with means for receiving the cotton seed thereupon. As illustrated, the means for retaining the cotton seed upon the disks are provided by fluting the disks forming alternate grooves $g^1$ and ribs $g^2$. It will be perceived that, owing to the relative size of gears $x$ and $f^1$, the screw conveyer will rotate at a smaller rate of speed than the carrier G.

Above the carrier are mounted means for separating the bunches of seed and enabling the said seed to be delivered separately or approximately so from the carrier. As illustrated, such means comprise a separator H in the form of a block, the lower face of which is preferably formed of a shape somewhat corresponding to that of the carrier G, and as I have illustrated a round carrier, I have also illustrated the face of the separator as being formed in the arc of a circle substantially conforming to the arc of the carriers G. The operative face $h$ of the separator is formed with a roughened frictional face which will cause the said separator to grip the seeds and move them with relation to each other. A desirable way in which such face may be formed is illustrated and consists of forming the said face with pointed teeth whereby a serrated outline is presented. The separator is mounted upon crank shaft $h^1$ and has a projecting arm $h^2$ to which is pivoted a link $h^3$ which in turn is pivotally secured to the frame. Crank shaft $h^1$ carries a pinion $h^4$ by which said shaft is driven from the main shaft X to gear wheel $x^1$ thereon, with which said pinion is in mesh. As will be perceived from Fig. 5, the relative sizes of pinions $h^4$ and $x^1$ are such as to cause the separator H to travel at a faster rate of speed than the carrier G, whereby when the separator in its oscillation approaches the said carrier, it will be drawn or raked over the seed and will pull or separate the seeds.

Upon the front wall of the hopper E a spring cover $e^2$ is provided which enters the space between the screw conveyers F opposite the reduced portion $f$ of the screw conveyer shaft, and this spring blade is intended to cover the opening $e^1$ in the said front wall, or so much thereof as is not required for rotation of the carrier G, which enters a slot in said wall. The separator H has an oscillatory motion around its crank shaft $h^1$, its front end is caused to tip downward as it passes toward the rear of the machine, by link $h^3$, thereby bringing the face of the separator near enough to the carrier G to permit it to perform its function. In its forward travel the separator H hits the spring cover $e^2$ and presses the same out and away from the opening $e^1$, permitting a supply of seed to be fed by the conveyer to the said carrier. From the carrier the seed is dropped through an upper extension $d^3$ of the hollow leg D into said leg and to the trench made by the same in the ground.

To prevent the seed accumulating in the said hollow leg, and also to prevent the same from again becoming attached in bunches, I may provide an agitator I, the free end of which is situated within the hollow leg D and which is attached to the front of the separator arm $h^2$; thereby as the said arm is oscillated to and fro a corresponding motion will be given to the agitator and it will effectually jostle the seeds. Owing to the spaces $g^1$ in the carrier G it is possible that the seed may become wedged therein, and if this should happen I provide means for removing such seed which, as illustrated, comprises dislodging fingers J, of which one is provided for each space $g^1$ and which are mounted upon an arm $j$ pivotally attached to the frame.

From the foregoing it will be observed that the separation of the seed is begun in the hopper, where the seed are massed together in balls and clusters. The screw conveyer while feeding the seed to the carrier G breaks up the balls and feeds the seed in a rope like form to the carrier. They are next moved by the carrier out of the hopper and the corrugations in the carrier again tend to break up these ropes of seed into very short pieces or clusters which are deposited in the recesses in the carrier. While these short bunches of seed are being slowly moved on this rotary carrier, the separator H, oscillating at a different rate of speed from the carrier, approaches very near said carrier and then away from it, breaking up the clusters of seed and very successfully tearing them apart to the individual unit or approximately so and delivering them to the hollow leg D where the agitator I both assists in separation and in preventing the formation of further undesirable clusters. The proportion of gears $h^4$ and $x^1$ is such that the separator will move much faster than the carrier whereby the rubbing action is produced and the revolution of the separator in its orbit being faster than the rotation of the carrier all of the seed carried by the latter will be subjected to the action of the separator. The seed, having thus been dropped and deposited in the trench, made by the plow $d$, is covered by the rear wheel C, which as illustrated in Fig. 3, has a concave rim $c$.

I have shown my invention as applied for convenience of understanding to an organized machine. This has a structural iron frame A supported upon two wheels B and C known as the front and rear wheels. These wheels are placed upon the same center line and the front wheel B operates the dropping mechanism, while the rear wheel C carries the rear end of the machine and is supplied with a concave rim $c$ which will cover the seed when dropped. The frame A of the machine, which may be formed of angle iron, has a forward part $a$ and a rear part $a^1$ which are pivotally united at $a^2$. The forward part of the frame is supported by the wheel B and the rear part of the frame by the wheel C, and the said wheels may well be formed to track, and I have so illustrated them. Upon the frame *a* is supported a hollow leg or conducting tube D, the lower part of which at *d*, when the planter is in operation, extends somewhat below the bottoms of wheels B C, and acts as a plow forming a trench for the seed. This is supported by an arm or shoe *d¹* which may be carried by a brace *d²* extending between the opposite side members of the frame *a*.

When it is desired to raise the hollow leg D from the ground, as for instance, in taking the frame from place to place, I provide means whereby the said front frame may be lifted out of contact with the ground and in Fig. 2 I have illustrated it in such position. Such means comprises a lock for retaining the jointed frame in lifted position. Any convenient form of lock may be employed for this purpose. A desirable form is illustrated in Fig. 2 and comprises a lever K having a notch *k* on its under face which is adapted to receive a pin *k¹* upon guide *k²* upon which the said lever slides and within which it may move vertically. The guide *k²* is pivoted upon the hinge *a²* and the lever K upon the forward frame *a* at *k⁵*; thereby, as handles *a³* are depressed the frame is lifted between the wheels at the pivot point *a²*, causing the lever K to slide in the guide *k²* until the notch *k* comes opposite the pin *k¹*, whereupon the lever drops on said pin and is held in such position by weight *k³*. When it is desired to release the lock the handle *k⁴*, which is pivoted to the frame, may be depressed, lifting the lever K and permitting the plow to drop.

My seed planter is shown as being provided with a clevis or hook *a⁴* by which it may be hauled. Practical use of my device has demonstrated that the seeds are delivered to the furrow either singly or in such small numbers as to conform to the practical requirements of cotton seed planting, a result which so far as I am aware has not hitherto been attained by an automatic device for this purpose.

I have found that the following proportions produce a machine which operates desirably, although I do not know that they are the best proportions, to wit, the separator in its travel is distant from the carrier from 1 inch to 5/16 of an inch. The screw conveyer is distant from the carrier 3/16 in., and this distance permits the cotton seed to pass between these two parts without crushing.

It is not to be understood, by reason of the particularity with which I have described details of construction, that I deem my invention as necessarily limited to such details, as it will be obvious that many modifications in construction, form, shape and arrangement of parts, may be made within the limits of the appended claims, without departing from my invention.

What I claim is:—

1. In a cotton seed planter, a hopper, a conveyer therein for conveying seeds to the feeding point, a movable carrier adapted to transport seed therefrom, and a separator located outside the feed opening from said hopper and movable in relation to said carrier, operating by frictional contact with the seeds in said carrier to break up the clusters of seed and to separate the seed as they are fed.

2. In a seed planter, a hopper, a conveyer therein for conveying seed to the feeding point, a revolving carrier adapted to transport seed therefrom, and a reciprocating separator located adjacent the feed opening from said hopper and moving at a different rate of speed from said carrier and adapted to rub against the seed carried by said carrier and to separate said seed as they are fed.

3. In a seed planter, a hopper, a conveyer for conveying seeds to the feeding point, a revolving carrier having a plurality of peripheral recesses for transporting seed therefrom, a moving separator adapted to move adjacent to said carrier and to rub against the seed in said recesses and to separate them.

4. In a seed planter, a hopper, a screw conveyer for conveying seeds to the feeding point, a revolving carrier having a plurality of peripheral pockets for transporting seed therefrom, an oscillating separator having a friction face adapted to travel adjacent to said carrier and to rub against the seed therein and to separate them.

5. In a seed planter, a hopper, a double-acting screw conveyer for conveying seeds to the feeding point, a rotary carrier having a plurality of slitted transverse peripheral ribs, forming seed pockets between said ribs, an oscillating separator, having a roughened face formed substantially in the arc of the circle of said carrier, and adapted to travel adjacent to said carrier and to rub against the seed carried thereby and to separate them.

6. In a seed planter, a hopper, a conveyer therein, a carrier adapted to receive seed therefrom, a moving separator, operating in connection with said carrier to separate seed carried thereby, a chute and an agitator therein.

7. In a seed planter, a movable seed carrier and means for delivering seed thereto, a separator movable at a different speed from that of the carrier and adapted to travel adjacent thereto and in the same direction and to rub against adhering seed carried by said carrier and to separate them from each other.

8. In a seed planter, a rotary seed carrier having a series of radial channels, means for delivering seed thereto, a moving separator having a friction-face formed in substantially the arc of the circle of said carrier, and adapted to move adjacent to said carrier and to rub against and separate seed carried thereby.

9. In a seed planter, a rotary seed carrier comprising a plurality of connected disks between which are spaces forming a series of radial channels, each disk having transverse peripheral ribs, means for delivering seed thereto, a movable separator having a friction-face adapted to travel adjacent said carrier and to rub against and separate the seed carried thereby, and stationary seed-dislodging fingers adapted to enter said radial channels and dislodge lodged seed.

10. In a seed planter, a carrier having seed-carrying means thereon, a movable separator adapted to travel adjacent the said carrier, and having a friction face conforming in shape to the adjacent face of the carrier and adapted when traveling adjacent said carrier to rub against and separate seed carried thereby.

11. In a seed planter, a rotary carrier having peripheral seed pockets, a moving separator having a friction face, formed substantially in the arc of the circle of said carrier, and adapted to travel adjacent thereto and to rub against and separate seed carried by said carrier.

12. In a seed planter, a rotary carrier having peripheral seed pockets, a moving separator having a toothed face formed substantially in the arc of the circle of said carrier, and adapted to travel adjacent thereto and to rub against and separate seed carried by said carrier.

13. In a seed planter, a seed hopper, a conveyer in said hopper, a rotary carrier adjacent the feeding point of said conveyer, an opening in the casing of said hopper to permit the feeding of seed, a spring cover for said opening, a moving separator having a serrated face adapted to open said spring cover in its forward movement and permit the feeding of seed from said hopper and adapted to travel adjacent said carrier and separate the seed carried thereby.

14. In a seed planter, a seed hopper having an inclined floor, a double-screw conveyer in said hopper at the lower part of said floor, a plurality of rotary disks fluted peripherally adjacent the feeding point of said conveyer, an opening in the casing of said hopper to permit the feeding of seed, a spring cover for said opening, an oscillating separator having a serrated face adapted to open said spring cover in its forward movement and permit the feeding of seed from said hopper, and adapted to travel adjacent said carrier and separate the seed carried thereby.

15. In a seed planter, a hopper, and a movable carrier adapted to feed seeds from said hopper, and a movable separator, having its effective movement in the direction of movement of said carrier, located outside of said hopper and acting in combination with said carrier to separate the seed carried thereby.

16. In a seed planter, a hopper, and a rotary carrier adapted to feed seeds from said hopper, and a reciprocating separator located outside of said hopper having frictional contact with the seed carried by said carrier when moving in the direction of movement of the carrier and acting in combination with said carrier to separate the seed carried thereby.

17. In a seed planter, a hopper, a conveyer therein adapted to feed seeds to a carrier and to effect a partial separation thereof, and a rotary carrier adapted to receive seeds from said conveyer, and a reciprocating separator located outside of said hopper, having its effective movement in the direction of movement of said carrier, and adapted to rub against the seed carried thereby and to separate them from each other.

18. In a cotton seed planter, a container for the cotton seed, means for moving the seed toward the point of delivery from said container which effect a partial separation of the seed, and means for carrying the seed from the container which effect a still further separation of the seed, and means located outside the container which by frictional contact with the seed in said carrier effect a further sub-division and deliver the seeds in separated condition for planting.

19. In a cotton seed planter, a hopper, a conveyer therein for moving the seed to the point of delivery, a rotary seed carrier adapted to carry seed therefrom and to partially break up and separate the clusters of seed, and a separator adjacent the carrier and having a path of movement in part substantially coinciding with the path of the carrier, whereby when said separator moves in the same direction as the carrier it is adapted to rub against the seed carried thereby and to separate them in condition for planting.

20. In a cotton seed planter, a hopper, a screw conveyer therein for moving the seed to the point of delivery which effects a partial separation of the seed, a rotary seed carrier adapted to carry seed therefrom and to further separate the seed, and an oscillating separator adjacent the carrier and having a path of movement in part substantially coinciding with the path of the carrier, said separator adapted to move at a different rate of speed from the carrier, whereby when said separator moves in the same direction as the carrier it is adapted to rub against the seed carried thereby and to separate them in condition for planting.

21. In a cotton seed planter, a hopper, a conveyer therein for moving the seed to the point of delivery, a rotary seed carrier adapted to carry seed therefrom and to partially break up and separate the clusters of seed, and a separator adjacent said carrier and having a frictional face conforming substantially to the seed carrying face of said carrier, having a path of movement in part substantially coinciding with the path of the carrier, whereby when said separator moves in the same direction as the carrier it is adapted to rub against the seed carried thereby and to separate them in condition for planting.

22. In a cotton seed planter, a hopper, a conveyer therein for moving the seed to the point of delivery, a rotary seed carrier adapted to carry seed therefrom and to partially break up and separate the clusters of seed, and a separator adjacent said carrier and having a path of movement in part substantially coinciding with the path of the carrier, whereby when said separator moves in the same direction as the carrier it is adapted to rub against the seed carried thereby and to separate them in condition for planting, and means for causing said separator to move at a faster rate of speed than the carrier, whereby all of the seed carried thereby are subjected to the separating effect of said separator.

In witness whereof, I have hereunto signed my name in the presence of two subscribing witnesses.

PETER A. CUSTER.

Witnesses:
B. J. O'NEILL,
EUNICE E. ECCLES.

---

Copies of this patent may be obtained for five cents each, by addressing the "Commissioner of Patents, Washington, D. C."